W. FINN.

RELAY AND REPEATER.

APPLICATION FILED OCT. 19, 1916.

Reissued May 22, 1917. 14,304.

WITNESSES:

S. McKeen

Paul H. Franke

INVENTOR.

William Finn

BY H. M. Marble

ATTORNEY

UNITED STATES PATENT OFFICE.

WILLIAM FINN, OF BLOOMFIELD, NEW JERSEY, ASSIGNOR TO THE WESTERN UNION TELEGRAPH COMPANY, OF NEW YORK, N. Y., A CORPORATION OF NEW YORK.

RELAY AND REPEATER.

14,304. Specification of Reissued Letters Patent. Reissued May 22, 1917.

Original No. 1,164,873, dated December 14, 1915, Serial No. 878,403, filed December 21, 1914. Application for reissue filed October 19, 1916. Serial No. 126,630.

*To all whom it may concern:*

Be it known that I, WILLIAM FINN, a citizen of the United States, and a resident of Bloomfield, in the county of Essex and State of New Jersey, have invented certain new and useful Improvements in Relays and Repeaters, of which the following is a specification.

My invention relates to improvements in relays and repeaters, particularly relays and repeaters intended for high speed operation.

The relay and repeater herein illustrated and described is particularly intended for use in automatic telegraph systems, wherein current impulses succeed each other through the line at rates far in excess of those of hand transmission; but my invention is not limited to use in automatic telegraph systems, but is adaptable for use wherever relays and repeaters are or may be employed.

Before a signaling impulse can actuate the ordinary main line magnetic signal receiving devices, the main line current, and the magnetism created thereby in the main line signaling device, must necessarily rise to a value such as is required to effect transfer of the armature of that signal receiving device from one to the other of its contact stops. If the time interval here involved can be reduced in any way through the medium of local appliances, materially higher speed of transmission becomes possible together with better signals.

My invention comprises means whereby the armature of the receiving instrument is carried over positively from the one stop to the other once that armature has been started in motion; and further comprises means whereby such movement of the armature is started, by local means, upon the diminution of the main line current which previously held that armature stationary against one or the other of its stops, and whereby the armature is caused to anticipate in its operation, the arrival of the next succeeding line signaling impulse. And my invention comprises various other features, all as hereinafter described, and particularly pointed out in the appended claims.

The objects of my invention are to increase the effective speed of transmission of signals over telegraph circuits and the like, to reduce lag in repetition of signals, to obtain improved and sharper signals, particularly on high speed lines, to minimize the effects of induction and other influences tending to produce false signals, to avoid sparking between the moving tongue or armature of the relay and the contact points with which such tongue coacts, thus permitting very close adjustment of such contact points to the said tongue, and consequent small amplitude of movement of the tongue and brief duration of travel thereof, to permit a local recording or repeating instrument to start to operate to make a record before the contact tongue of the main relay shall have completed its travel from the one contact stop to the other, to completely separate the "opposing" and "accelerating" circuits of the relay from the line circuit, and to make the apparatus very simple and easy of construction and operation, and free from liability to derangement.

I will now proceed to describe my invention with reference to the accompanying drawings, and will then point out the novel features in claims. In the drawings:

Figure 1:
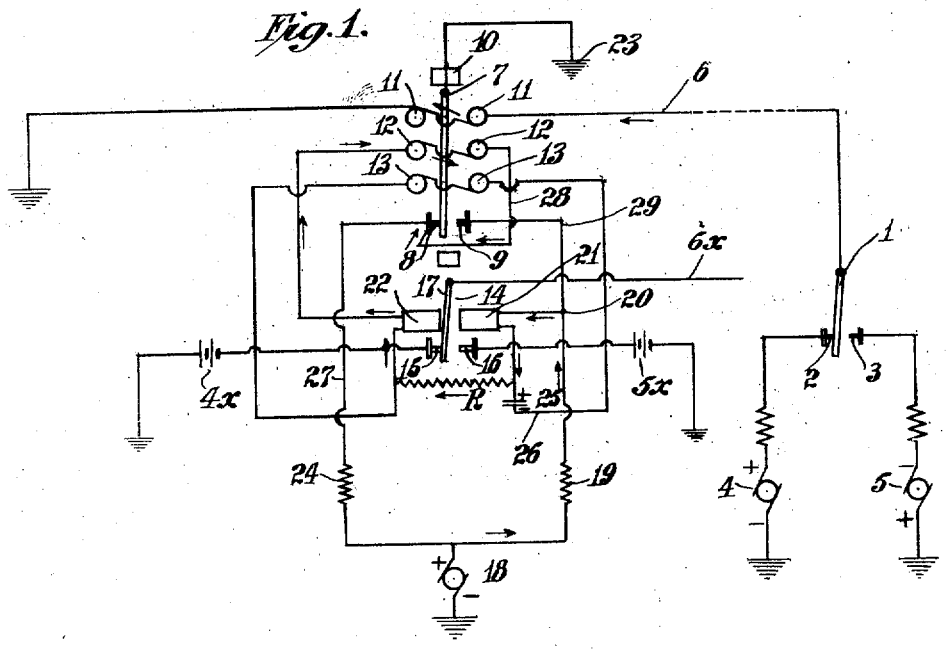
Figure 1 shows diagrammatically a telegraph line comprising transmitting apparatus (illustrated diagrammatically) and a receiving relay, the latter embodying my invention.

Referring first to Fig. 1, numeral 1 designates a transmitting key having contact stops 2 and 3 and current supply means 4 and 5 connected to stops 2 and 3 respectively. The particular current supply means indicated are dynamo electric machines of opposite polarities; though as is well understood, other sources of current supply may be employed; the particular arrangement shown being a common arrangement for transmission by current impulses of alternately opposite direction. The key 1 may be vibrated either by hand or by any suitable means, and I do not limit myself to any particular means for vibrating that key in accordance with telegraphic or other signals. The key 1 may be, for example, the movable contact arm of a Wheatstone transmitter or any other suitable type of automatic or machine transmitter. 6 designates the line conductor.

The receiving relay comprises an armature lever 7, indicated in this instance as a pivotally supported lever playing between contact stops 8 and 9. This armature lever 7 may be understood to be a magnetized lever, similar to the magnetized armature levers employed in so-called "polar" relays, and the rectangle 10 may be understood to represent one pole of a magnet energizing this relay armature lever 7. On opposite sides of the lever 7 (in the particular arrangement shown) are electromagnets 11—11, 12—12 and 13—13, each pair of magnet spools arranged to influence the lever 7 just as the magnet spools of an ordinary polar relay actuate the armature lever of such relay. While I have shown the spools 11—11, 12—12 and 13—13 as separate spools, for clearness of diagrammatic illustration, it will be understood that in practice only one pair of spools may, and commonly will, be employed, such spools each having three different windings corresponding to the windings 11, 12 and 13. It it not uncommon in polar relays to provide each spool with two or more separate windings; but it is common for clearness of illustration, to indicate such separate windings, in diagrammatic drawings, as if such separate windings were on different spools.

14 designates a local or secondary relay which may be understood to be a polar relay and to be capable of operating by means of contact stops 15 and 16, and its armature 17, any desired local signal receiving or signal repeating or translating apparatus; or the armature 17 may operate such signal receiving or signal repeating or translating apparatus mechanically; this being, for present purposes, an immaterial detail; or the instrument 14 may be itself a sounder; and for present purposes, the relay 14 may be regarded as the local receiving and repeating instrument of the telegraph system. That it may be understood as capable of repeating into a further line circuit, 6×, I have shown such further line circuit 6× connected to the armature 17 of the secondary relay 14, and have shown sources of current supply, 4× and 5×, of relatively opposite potential, connected to its contact stops 15 and 16.

In this specification I will term the windings 11 "main line coils," the windings 12 "opposing coils" and the windings 13 "accelerating coils," and will term coils 12 and 13, collectively, "auxiliary electro-magnetic means." The windings 11 are, as shown, in the main line circuit 6; the windings 12 are in a local circuit branch (traced hereafter) and controlled by the contact stops 8 and 9 and armature lever 7; and the windings 13 are also in a local circuit branch. The particular function of the opposing windings or coils 12 is to develop a polarity of magnetism that shall always be opposed to the magnetism created by the main line coils 11, the magnetism created by the opposing coils 12 not being so strong, however as that created by the working current of the main line 6 in coils 11. The particular function of the accelerating coils 13 is to carry the armature 7 across the gap between stops 8 and 9, once the armature lever 7 has been set in motion as hereinafter described.

Fig. 1 shows the apparatus with its movable parts in the positions occupied with the transmitting key 1 in contact with contact stop 2, and with the apparatus at rest. Arrows indicate the relative directions of flow of current with the parts at rest in the positions shown. As indicated by such arrows, the current from generator 4 in main line 6 tends to hold armature lever 7 to the left in contact with stop 8.

There is a local generator 18 supplying current to the opposing coils 12 as follows:—from the positive pole of generator 18 (negative pole grounded, in the arrangement shown) through balancing resistance 19 to 20 and thence through coil 21 of local relay 14 to resistance R thence through such resistance R and coil 22 of relay 14 to opposing coils 12, and through those coils to contact stop 8, and thence through armature lever 7 to ground at 23. The current from generator 18 through the opposite balancing resistance, 24, passes directly to ground at 23 through armature lever 7, and does not affect the "opposing" coils 12; but because of resistance 24, the circuit through such resistance 24 does not completely "short" the circuit, as traced above, through resistance 19. The current through opposing coils 12, causes those coils to oppose, with respect to the armature 7, the action of the main line current in coils 11 on that armature; but since the influence of coils 12 upon armature lever 7 is normally less than that of coils 11, energized by the main line current, armature 7 remains stationary in the position shown. Normally, there is no current through "accelerating" coils 13. But when the predominating influence of the main line current is removed (as when the transmitting key 1 is moved toward stop 3), the magnetization induced by "opposing" coils 12 forces armature lever 7 away from the stop 8 and toward the stop 9. There is a condenser 25 bridged across the resistance R by the local circuit conductor 26, which local circuit passes through accelerating coils 13. The instant armature lever 7 leaves contact stop 8 the current energizing opposing coils 12 ceases, and at this instant condenser 25 discharges. This discharge divides, one portion passing through resistance R, and the other through coil 21 of local relay 14, point 20, resistances 19 and 24, opposing coils 12 and coil 22 of local relay 14. Both portions re-unite so that the total discharge passes through accelerating coils 13. The direction of the portion of the discharge passing through opposing coils 12 is such that this portion tends to oppose the movement of armature lever 7 toward its stop 9; but the reunited portions forming the whole discharge pass through accelerating coils 13 in such a direction that their preponderating effect tends to carry armature lever 7 over to its stop 9 with a force that renders the armature less affected by inductive distubances in line 6 or elsewhere that would otherwise affect movement of said armature lever 7.

Figure 2:
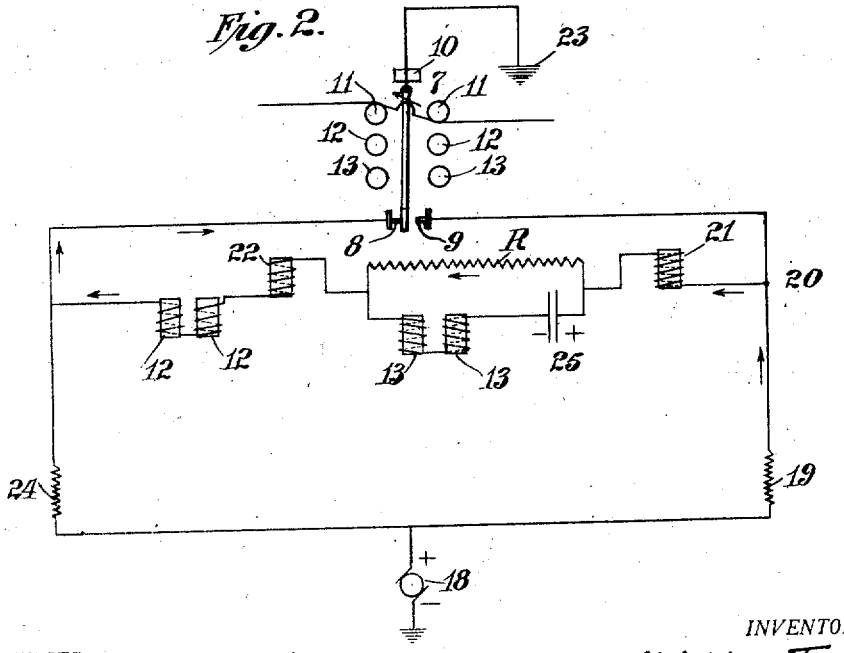
Fig 2 is a schematic diagram of the relay itself showing the same circuits as in Fig. 1, but with the circuit lines rearranged to make their relation more obvious.

(The relative relations of the circuit branches for opposing coils 12 and accelerating coils 13 and condenser 25, will be more apparent from Fig. 2, from which it will be seen that the opposing coils 12 and magnet coils 21 and 22 of the secondary relay 14 are in a branch circuit bridged across the two conductors containing resistances 19 and 24 and leading from one pole of generator 18 to opposing contact stops 8 and 9; and that the resistance R on the one hand, and the accelerating coils 13 and condenser 25 on the other hand, are connected in parallel and in shunt with respect one to the other, in this bridged circuit branch).

It will thus be seen that the movement of the armature lever 7 may be completed before the movement of the transmitting key 1 is completed; that the movement of armature lever 7 may actually begin before transmitting key 1 has made contact with its stop 3, and before the next signaling impulse to which such movement of the armature lever 7 corresponds, has even begun.

Auxiliary or repeating or secondary relay 14 is actuated by the discharge of the condenser and since this discharge begins when armature 7 begins to move, the secondary relay operates almost without lag with respect to armature 7.

Armature 7 having made contact with stop 9, the current from generator 18 is established through the "opposing" coils 12 and the magnetic coils of relay 14, in a direction opposite to its former direction; *i. e.*, is established through balancing resistance 24, conductors 27 and 28, coils 12, coil 22 of relay 14, resistance R, coil 21 of relay 14, and conductor 29, to contact stop 9 and thence through armature lever 7 to ground at 23. Meanwhile transmitting key 1 has made contact with stop 3. The condenser 25, having charged immediately upon the reëstablishment of current flow from the generator 18 through the opposing coils 12, is in condition to act again from reverse movement of transmitting key 1 from stop 3 to stop 2. In such reverse movement the action is precisely similar to that above described, the current in the "opposing" coils 12 being reversed immediately after the armature lever 7 leaves the stop 9, due to a portion of the discharge of condenser 25; the entire discharge passes through accelerating coils 13 so tending to carry the armature lever 7 over against the contact stop 8.

Because, during its movement, the armature 7 is under the influence of the accelerating coils, the instrument is practically free from disturbance due to inductive interference and the like. Because the armatures 7 and 17 tend to move, in correspondence with any movement of the corresponding transmitter, immediately after that transmitter begins to move, lag in the operation of the instrument is almost entirely avoided and thereby the operation of the circuit is very greatly quickened. A further important advantage of these instruments is that there is very little, if any, tendency to spark, or arc, at the relay contact points 8 and 9; which contact points can, therefore, be adjusted more closely for high speed work than is the case with ordinary relays. This immunity from sparking and its consequences, is due to the fact that in addition to the single polarity arrangement in the contacts of the relay, there are two continuous paths through which the shunted condenser may discharge, viz:—one through the high resistance shunt and the other through the coils 21 and 22 of secondary relay 14 and through opposing coils 12; therefore the tendency to discharge across the break points of the relay (which is a characteristic of the ordinary shunted condenser arrangement), is almost entirely obviated.

In the accompanying drawings for the sake of simplicity the connections are shown for simplex working; but it is obvious that the relay may be provided for differential coils, in the ordinary manner, to adapt it to duplex working.

There is an instrument of the prior art, known as the Gulstad relay, and described in *The Electrical Review* (London) in two series of articles beginning in volume 42, page 751, dated June 3, 1898, and in volume 51, page 294, dated August 22, 1902, wherein the magnets are provided, not only with main line coils, but also with local circuit coils to which are connected condensers and resistances; the said local circuits being connected, between the spools of the magnets, to the armature of the relay, and so, when said armature is against one of its stops or the other, (such stops being connected, respectively, to batteries of opposite polarity) to a source of current supply, the polarity of such current depending on the stop with which the armature is in contact; the effective result being that when the current in the main line dies down a current already flowing through a local circuit causes the relay armature to leave the stop with which it has been in contact, and to move toward the opposite stop; and as soon as such armature leaves the stop with which it has been in contact, a condenser discharges through a local circuit in a direction to hasten the movement of the armature to its opposite stop and to hold it against such opposite stop when it arrives there. Immediately thereafter a current of opposite direction is established in a local circuit, tending to reverse the armature again; but in the mean time the main line current has been established in a direction to hold the armature against the stop which it has just reached, and the weaker local circuit influence cannot reverse the armature until the current in the main line begins to die down, as incident to another reversal of the main line current.

Among the features which distingush my improved relay above described from the Gulstad relay are the following:

In the Gulstad relay it is necessary that the tongue of the relay shall play between contact stops which are connected respectively to sources of current supply of opposite polarities. This leads to sparking between such stops and the moving tongue or armature of the relay. In my relay herein described, however, since both contact stops 8 and 9 of the relay are connected to the same pole of the generator 18, these contact stops may be adjusted very closely, without sparking, thus reducing the amplitude of vibration of the armature, as compared with what is possible in the Gulstad relay, and permitting very much higher speed of operation.

In my improved relay above described, the circuit of the accelerating coils 13 and the opposing coils 12 is an entirely local circuit; it is substantially unaffected by line conditions, and in it any potential, any capacity, and any resistance may be used, as conditions may dictate. In the Gulstad relay, however, the local circuits are connected to the outgoing line, derive their current from line, and are restricted as to potential and capacity employed by incoming and outgoing line conditions.

In order that the Gulstad relay may produce a local record, it is necessary that the contact tongue of the relay shall have completed its travel, and shall have contacted with the contact stop on the opposing side, before the starting of the record begins; whereas in my relay herein described, the making of the local record is started, (*i. e.*, the reversal of the armature 17 is started), the instant the armature lever 7 leaves that stop, 8 or 9, with which it has been in contact, and the reversal of the armature 17 may be completed before the reversal of the armature 7 is completed.

It might possibly be thought while, by supplying currents of the same polarity to contact points 8 and 9 of the main relay of my instrument, sparking there is avoided, the difficulty has merely been transferred to the contact points of the secondary relay 14. This, however, is not so, at least to any considerable extent. The magnets of this secondary relay being in an entirely local circuit, and the operation of the relay being effected by the discharge of the condenser, the movement of the armature 17 of this secondary relay 14 is very rapid indeed; for which reason the armature 17 breaks contact very quickly; and because of such quick breaking of contact, the contact points coacting with this armature may be set up closely, so permitting a very high rate of operation of this secondary relay.

What I claim is:—

1. A polarized relay or like electric instrument adapted for actuation by reversal of polarity in a main circuit to which it may be connected, and comprising a movable polarized armature and opposing contacts therefor, main-circuit electro-magnetic means arranged to influence said armature, auxiliary electro-magnetic means likewise arranged to influence such armature, and entirely local circuit means and current supply means for such auxiliary means, controlled by said armature and its contacts and arranged to cause such auxiliary means normally to oppose as to said armature the influence of the main circuit electro-magnetic means and comprising also capacity arranged to cause such auxiliary means to influence the armature to carry it across once motion of that armature is started, current potential of the same sign being applied to both said contacts.

2. A polarized relay or like electric instrument adapted for actuation by reversal of polarity in a main circuit to which it may be connected, and comprising a movable polarized armature and opposing contacts therefor, main-circuit electro-magnetic means arranged to influence said armature, auxiliary electro-magnetic means likewise arranged to influence such armature, and entirely local circuit means and current supply means for such auxiliary means, controlled by said armature and its contacts and arranged to cause such auxiliary means normally to oppose as to said armature the influence of the main circuit electro-magnetic means and comprising also capacity arranged to cause such auxiliary means to influence the armature to carry it across once motion of that armature is started, current potential of the same sign being applied to both said contacts, and a secondary instrument included in such local circuit means and arranged to be actuated upon movement of such armature.

3. A polarized relay or like electric instrument adapted for actuation by reversal of polarity in a main circuit to which it may be connected, and comprising a movable polarized armature and opposing contacts therefor, main-circuit electro-magnetic means arranged to influence said armature, auxiliary electro-magnetic means likewise arranged to influence such armature, and entirely local circuit means and current supply means for such auxiliary means, controlled by said armature and its contacts and arranged to cause such auxiliary means normally to oppose as to said armature the influence of the main circuit electro-magnetic means and comprising also capacity arranged to cause such auxiliary means to influence the armature to carry it across once motion of that armature is started, current potential of the same sign being applied to both said contacts, and a secondary instrument included in such local circuit means and arranged to be actuated by discharge of such capacity.

4. A polarized relay or like electric instrument adapted for actuation by reversal of polarity in a main circuit to which it may be connected, and comprising a movable polarized armature, main-circuit electro-magnetic means arranged to influence said armature, auxiliary electro-magnetic means likewise arranged to influence such armature, and entirely local circuit means and current supply means for such auxiliary means, arranged to cause such auxiliary means normally to oppose as to said armature the influence of the main circuit electro-magnetic means and comprising also capacity arranged by its discharge to cause such auxiliary means to influence the armature to carry it across once motion of that armature is started, and a transmitter included in such local circuit means and arranged to be actuated upon movement of such armature.

5. A polarized relay or like electric instrument adapted for actuation by reversal of polarity in a main circuit to which it may be connected, and comprising a movable polarized armature and opposing contacts therefor, main circuit electro-magnetic means arranged to influence such armature, opposing electro-magnetic means and accelerating electro-magnetic means each likewise arranged to influence such armature, and entirely local circuit means and current supply means for such opposing and accelerating means, controlled by said armature and its contacts and arranged to cause such opposing means normally to oppose as to said armature the influence of the main circuit electro-magnetic means, and comprising also means to cause such accelerating means to influence the armature to carry it across once motion of that armature is started, current potential of the same sign being applied to both said contacts.

6. A polarized relay or like electric instrument adapted for actuation by reversal of polarity in a main circuit to which it may be connected, and comprising a movable polarized armature and opposing contacts therefor, main-circuit electro-magnetic means arranged to influence such armature, opposing electro-magnetic means and accelerating electro-magnetic means each likewise arranged to influence such armature, and entirely local circuit means and current supply means for such opposing and accelerating means, controlled by said armature and its contacts and arranged to cause such opposing means normally to oppose as to said armature the influence of the main circuit electro-magnetic means, and comprising also capacity arranged by its discharge to cause such accelerating means to influence the armature to carry it across once motion of that armature is started, current potential of the same sign being applied to both said contacts.

7. A combination relay or like electric instrument comprising two relays, one controlled by the other, the first of said relays having a polarized armature and main circuit electro-magnetic means arranged to influence said armature, and having also auxiliary electro-magnetic means likewise arranged to influence such armature and circuit means therefor whereby said armature is caused to move to reverse its position upon diminution of the main line current to a predetermined degree, and in advance of establishment of such main line current in an opposite direction, the second of said relays arranged to be operated to reverse position of its armature upon beginning of movement of the armature of the first mentioned relay and in advance of completion of the reversal of the armature of such first mentioned relay.

8. A polarized relay or like electric instrument adapted for actuation by reversal of polarity in a main circuit to which it may be connected, and comprising a movable polarized armature, main-circuit electro-magnetic means arranged to influence said armature, opposing contacts with which such armature will contact in opposite positions, a source of current supply, two circuit branches connecting one pole of such source of current supply, the one to the one said contact and the other to the other said contact, each of such circuit branches containing resistance, auxiliary electro-magnetic means likewise arranged to influence said armature, a circuit branch containing said auxiliary means and bridged across the two contacts, and a condenser and a resistance shunt therefor, both included in such bridged circuit branch.

9. A polarized relay or like electric instrument adapted for actuation by reversal of polarity in a main circuit to which it may be connected, and comprising a movable polarized armature, main-circuit electro-magnetic means arranged to influence said armature, opposing contacts with which such armature will contact in opposite positions, a source of current supply, two circuit branches connecting one pole of such source of current supply, the one to the one said contact and the other to the other said contact, each of such circuit branches containing resistance, opposing and accelerating electro-magnetic means likewise arranged to influence said armature, a circuit branch containing said opposing and accelerating means and bridged across the two contacts, the said bridged circuit branch connected to said opposing and accelerating means to cause them to influence the armature oppositely, a condenser included in said bridged circuit branch, and a resistance shunt around such condenser and accelerating means.

10. A polarized relay or like electric instrument adapted for actuation by reversal of polarity in a main circuit to which it may be connected, and comprising a movable polarized armature, main-circuit electro-magnetic means arranged to influence said armature, opposing contacts with which such armature will contact in opposite positions, a source of current supply, two circuit branches connecting one pole of such source of current supply, the one to the one said contact and the other to the other said contact, each of such circuit branches containing resistance, auxiliary electro-magnetic means likewise arranged to influence said armature, a circuit branch containing said auxiliary means and bridged across the two contacts, a condenser and a resistance shunt therefor, both included in such bridged circuit branch, and a secondary electric instrument having controlling magnet coils in said bridged circuit branch and arranged to be energized by current passing therethrough.

11. A polarized relay or like electric instrument adapted for actuation by reversal of polarity in a main circuit to which it may be connected, and comprising a movable polarized armature, main-circuit electro-magnetic means arranged to influence said armature, opposing contacts with which such armature will contact in opposite positions, a source of current supply, two circuit branches connecting one pole of such source of current supply, the one to the one said contact and the other to the other said contact, each of such circuit branches containing resistance, auxiliary electro-magnetic means likewise arranged to influence said armature, a circuit branch containing said auxiliary means and bridged across the two contacts, a condenser and a resistance shunt therefor, both included in such bridged circuit branch, and a transmitting relay having controlling magnet coils in said bridged circuit branch and arranged to be energized by current passing therethrough.

12. A polarized relay or like electric instrument adapted for actuation by reversal of polarity in a main circuit to which it may be connected, and comprising a movable polarized armature, main-circuit electro-magnetic means arranged to influence such armature, opposing contacts with which such armature will contact in opposite positions, opposing and accelerating electro-magnetic means likewise arranged to influence such armature, and a circuit therefor including a source of current supply and a condenser, such circuit connected to said contact points in such manner that current potential of the same sign is applied to both contact points, the circuit arrangement being such that the opposing electro-magnetic means normally opposes, as to the armature, the influence of the main circuit electro-magnetic means, the direction of influence of the opposing electro-magnetic means and the polarity of the charge of the condenser being reversed by a reversal of position of the armature, and that the accelerating means is energized by discharge of the condenser consequent upon breaking of contact by said armature with either of its said contacts.

13. A polarized relay or like electric instrument adapted for actuation by reversal of polarity in a main circuit to which it may be connected, and comprising a movable polarized armature, main-circuit electro-magnetic means arranged to influence said armature, opposing contacts with which such armature will contact in opposite positions, a source of current supply, two circuit branches connecting one pole of such source of current supply, the one to the one said contact and the other to the other said contact, each of such circuit branches containing resistance, auxiliary electro-magnetic means likewise arranged to influence said armature, a circuit branch containing said auxiliary means and bridged across the two contacts, a condenser and a resistance shunt therefor, both included in such bridged circuit branch, and a transmitting relay included in such bridged circuit and arranged to be actuated by the condenser discharge.

In testimony whereof I have signed this specification in the presence of two subscribing witnesses.

WILLIAM FINN.

Witnesses:
PAUL H. FRANKE,
MAY I. TRIMBLE.